(12) United States Patent
Sakai

(10) Patent No.: US 8,609,222 B2
(45) Date of Patent: Dec. 17, 2013

(54) VEHICLE INTERIOR COMPONENT

(75) Inventor: Hideaki Sakai, Toyota (JP)

(73) Assignee: Toyoda Iron Works Co., Ltd, Toyota (JP)

(*) Notice: Subject to any disclaimer, the term of this patent is extended or adjusted under 35 U.S.C. 154(b) by 328 days.

(21) Appl. No.: 13/074,575

(22) Filed: Mar. 29, 2011

(65) Prior Publication Data

US 2011/0243686 A1 Oct. 6, 2011

(30) Foreign Application Priority Data

Apr. 6, 2010 (JP) ................ 2010-088196

(51) Int. Cl.
*B23B 3/04* (2006.01)
(52) U.S. Cl.
USPC .......................... 428/121; 428/167
(58) Field of Classification Search
USPC ........ 428/121, 126, 167; 296/70, 146.7, 39.1, 296/214, 1.08; 411/439
See application file for complete search history.

(56) References Cited

U.S. PATENT DOCUMENTS

| | | | | |
|---|---|---|---|---|
| 3,441,467 A * | 4/1969 | Odell | ............................ | 428/121 |
| 3,801,424 A * | 4/1974 | Robbins, Jr. | .................... | 428/43 |
| 5,015,034 A * | 5/1991 | Kindig et al. | ................. | 297/227 |
| 6,177,155 B1 * | 1/2001 | Kurosaki | ......................... | 428/31 |
| 7,036,876 B2 * | 5/2006 | Senoo et al. | ..................... | 296/214 |
| 7,556,852 B2 * | 7/2009 | Aoki et al. | ..................... | 428/172 |
| 8,056,951 B2 * | 11/2011 | Schilles | ...................... | 296/37.13 |

FOREIGN PATENT DOCUMENTS

JP U-4-24333 2/1992

* cited by examiner

*Primary Examiner* — Flemming Saether
(74) *Attorney, Agent, or Firm* — Oliff and Berridge, PLC

(57) ABSTRACT

A vehicle interior component in which a back-fastened member such as an upholstery or a noise insulator is fastened to a back side of a resin interior base material with a fastener, includes: a fastener-driven rib having plasticity and plate-like shape being integrally formed on the back side of the resin interior base material so as to protrude from the back side in such a posture that the fastener-driven rib is inclined at a predetermined angle with respect to the back side; and the fastener being driven into the fastener-driven rib so as to pass through the fastener-driven rib in such a posture that the fastener intersects with the fastener-driven rib, whereby the fastener is engaged with the fastener-driven rib.

20 Claims, 4 Drawing Sheets

VEHICLE INTERIOR COMPONENT

CROSS-REFERENCE TO RELATED APPLICATIONS

The disclosure of Japanese Patent Application No. 2010-088196 filed on Apr. 6, 2010 including the specification, drawings and abstract is incorporated herein by reference in its entirety.

BACKGROUND OF THE INVENTION

1. Field of the Invention

The invention relates to a vehicle interior component and, more particularly, to an improved technique for fastening, for example, an upholstery or a noise insulator to a back side of an interior base material with fasteners.

2. Description of the Related Art

There are widely known vehicle interior components such as a door trim and an instrument panel. In the vehicle interior component, a member that is fastened to a back side of an interior base material (hereinafter, referred to as "back-fastened member"), for example, an upholstery or a noise insulator is fastened to the back side of the interior base material with fasteners. A vehicle interior component described in Japanese Utility Model Application Publication No. 4-24333 (JP-U-4-24333) is an example of such a vehicle interior component. In this vehicle interior component, a thick-walled portion is formed at an outer peripheral end portion of an interior base material made of, for example, synthetic resin material. Then, fasteners are driven into an end portion of an upholstery, made of, for example, felt with the end portion overlapped with a back side of the thick-walled portion, whereby the fasteners are engaged with the thick-walled portion. Thus, the end portion of the upholstery is integrally fastened to the interior base material.

As shown in FIG. 4, an upholstery 102 is stuck onto a front side of a resin interior base material 100, for example, a door trim, and an end portion 104 of the upholstery 102 is folded toward a back side 108 at an outer peripheral end portion 106 of the resin interior base material 100 and is overlapped with a thick-walled portion 110 formed along the outer peripheral end portion 106. In this state, a fastener 112 is driven from the back side 108 through the end portion 104 into the thick-walled portion 110. Thus, the end portion 104 is integrally fastened to the thick-walled portion 110 of the resin interior base material 100.

However, in such a fastening structure, the following problems may occur because the thick-walled portion is partially formed. For example, deformation such as warpage easily occurs due to, for example, a difference in contraction between the thick-walled portion and a thin-walled portion, and shrinkage may cause poor appearance of an outer surface (front side) that is a decorative surface. In addition, a forming cycle is prolonged. To address this problem, the size of the thick-walled portion 110 may be reduced as shown in FIG. 5A, for example. However, as shown in FIG. 5B, if the position at which the fastener 112 is driven into the resin interior base material 100 (hereinafter, referred to as "fastener-driven position" where appropriate) deviates to the thin-walled portion (center portion of the resin interior base material 100), the fastener 112 may be easily disengaged from the resin interior base material 100, and a needle tip of the fastener 112 may protrude from the outer surface.

SUMMARY OF INVENTION

The invention is made in light of the above-described circumstances, and it is an object of the invention to appropriately engage a fastener with an interior base material while reliably preventing a needle tip of the fastener from protruding from an outer surface without forming a thick-walled portion that may cause deformation and shrinkage.

To achieve the above object, the first aspect of the present invention provides a vehicle interior component in which a back-fastened member such as an upholstery or a noise insulator is fastened to a back side of a resin interior base material with a fastener, comprising: (a) a fastener-driven rib having plasticity and plate-like shape is integrally formed on the back side of the resin interior base material so as to protrude from the back side in such a posture that the fastener-driven rib is inclined at a predetermined angle with respect to the back side; and (b) the fastener is driven into the fastener-driven rib so as to pass through the fastener-driven rib in such a posture that the fastener intersects with the fastener-driven rib, whereby the fastener is engaged with the fastener-driven rib.

The second aspect of the invention provides the vehicle interior component recited in the first aspect of the invention, wherein a plurality of the fastener-driven ribs are formed, and the fastener is driven into at least two of the plurality of the fastener-driven ribs and engaged with the at least two of the plurality of the fastener-driven ribs.

The third aspect of the invention provides the vehicle interior component recited in the first or second aspect of the invention, wherein the plurality of the fastener-driven ribs are inclined in a same inclination direction on the back side of the resin interior base material, and the plurality of the fastener-driven ribs are formed at a predetermined interval in the inclination direction such that the fastener-driven ribs overlap each other with at least part thereof in a direction perpendicular to the back side of the resin interior base material.

Note that the "inclination direction" means the direction on the back side of the resin interior base material, and the direction of the orthogonal projection that is formed by vertically projecting the direction in which the fastener-driven ribs protrude from the back side (the direction of the maximum inclination angle) onto the back side.

The fourth aspect of the invention provides the vehicle interior component recited in the third aspect of the invention, wherein the plurality of the fastener-driven ribs are formed such that an overlap region (E) in which two or more of the fastener-driven ribs overlap each other in the direction perpendicular to the back side of the resin interior base material is present continuously over a predetermined range that spans three or more of the fastener-driven ribs in the inclination direction.

The fifth aspect of the invention provides the vehicle interior component recited in the third or fourth aspect of the invention, wherein the plurality of the fastener-driven ribs are formed such that a fastener-driven region (e), in which the fastener is driven into two or more of the fastener-driven ribs when the fastener is driven into the fastener-driven ribs in the direction perpendicular to the back side of the resin interior base material, is present continuously over a predetermined range that spans three or more of the fastener-driven ribs in the inclination direction.

The sixth aspect of the invention provides the vehicle interior component recited in the fifth aspect of the invention, wherein (a) the plurality of the fastener-driven ribs each have a flat plate-like shape and are formed so as to be parallel to each other at a uniform height (H), at a uniform inclination angle ($\theta$) and at a uniform interval (P); and (b) the height (H), the inclination angle ($\theta$) and the interval (P) of the fastener-driven ribs are set in consideration of a needle length of the fastener such that the fastener-driven region (e) is obtained.

The seventh aspect of the invention provides the vehicle interior component recited in the any of the first to sixth aspect of the invention, wherein (a) the back-fastened member is an upholstery that is stuck to a front side of the resin interior base material, an end portion of the upholstery is folded toward the back side at an outer peripheral end portion of the resin interior base material and is fastened to the fastener-driven rib with the fastener; and (b) the fastener-driven rib is formed so as to be parallel to the outer peripheral end portion of the resin interior base material and so as to approach the outer peripheral end portion-side as the fastener-driven rib protrude from the back side.

As described above, in the vehicle interior component, the plate-like fastener-driven ribs having plasticity are integrally formed with the back side of the resin interior base material so as to protrude from the back side, in such a posture that the fastener-driven ribs are inclined at the predetermined angle. Then, the back-fastened member is overlapped with the fastener-driven ribs, and the fasteners are driven into the back-fastened member and the fastener-driven ribs so as to pass through the back-fastened member and the fastener-driven ribs. In this way, the fasteners are engaged with the fastener-driven ribs. In this case, the fastener-driven ribs are inclined at the predetermined angle and have plasticity. Meanwhile, the fasteners are driven into the fastener-driven ribs so as to pass through the fastener-driven ribs in such a posture that the fasteners intersect with the fastener-driven ribs. Therefore, when the force in the pullout direction acts on the fasteners, twisting, or the like, due to deformation of the fastener-driven ribs prevents the fasteners from being pulled out. Therefore, a pullout strength sufficient to fasten the back-fastened member appropriately is obtained.

In addition, the plate-like fastener-driven ribs are formed in a relatively thin shape. Therefore, poor appearance such as deformation and shrinkage is less prone to occur, a forming cycle is reduced, and it is possible to more reliably prevent the needle tip from protruding from the outer surface by appropriately setting the height of the fastener-driven ribs, than in the case of the existing structure shown in FIG. 4 and FIG. 5 where the thick-walled portion 110 is formed.

According to the second aspect of the invention, a plurality of the fastener-driven ribs are formed, and the fastener is driven into at least two of the plurality of the fastener-driven ribs and engaged with the at least two of the plurality of the fastener-driven ribs. Therefore, a higher pullout strength is obtained owing to twisting, or the like, due to individual deformation of the plurality of the fastener-driven ribs. This further effectively prevents the fastener from being disengaged from the fastener-driven ribs and, in addition, the back-fastened member from peeling from the resin interior base material.

According to the third aspect of the invention, the plurality of the fastener-driven ribs are inclined in a same inclination direction on the back side of the resin interior base material, and the plurality of the fastener-driven ribs are formed at a predetermined interval in the inclination direction such that the fastener-driven ribs overlap each other with at least part thereof in a direction perpendicular to the back side of the resin interior base material. Therefore, the region that the fastener is driven into the fastener-driven rib and can fasten the back-fastened member becomes wide. Thus, the work for driving the fasteners into the fastener-driven ribs is easily performed, and automation thereof becomes easy.

According to the fourth aspect of the invention, an overlap region (E) in which two or more of the fastener-driven ribs overlap each other in the direction perpendicular to the back side of the resin interior base material is present continuously over a predetermined range in the inclination direction. Therefore, by appropriately setting the fastener-driven direction or the needle length of each fastener, even if the fastener-driven position varies within the substantially same range as the overlap region (E), one fastener is driven into two or more fastener-driven ribs and engaged with these fastener-driven ribs. Thus, a higher pullout strength is obtained owing to twisting, or the like, due to individual deformation of the plurality of fastener-driven ribs, as well as the second aspect of the invention. This further effectively prevents the fasteners from being disengaged from the fastener-driven ribs and, in addition, the back-fastened member from peeling from the resin interior material. Moreover, the work for driving the fasteners into the fastener-driven ribs 24 is easily performed or automation thereof becomes easy.

According to the fifth aspect of the invention, the fastener-driven region e, in which each fastener is driven into two or more fastener-driven ribs when the fastener is driven into the fastener-driven ribs in the direction perpendicular to the back side of the resin interior base material, is present continuously over a predetermined range in the inclination direction. Therefore, even if the fastener-driven position varies within the range of the fastener-driven region e, each fastener is driven into two or more fastener-driven ribs and engaged with the two or more fastener-driven ribs. Thus, a higher pullout strength is obtained owing to twisting, or the like, due to individual deformation of the plurality of fastener-driven ribs as well as the second aspect of the invention. This further effectively prevents the fasteners from being disengaged from the fastener-driven ribs and, in addition, the back-fastened member from peeling from the resin interior material. Moreover, the work for driving the fasteners into the fastener-driven ribs 24 is easily performed or automation thereof becomes easy.

According to the sixth aspect of the invention, each of the plurality of fastener-driven ribs has a plate-like shape, the height H, the inclination angle $\theta$ and the interval P of the plurality of fastener-driven ribs are uniform and are set in consideration of the needle length of each fastener so that the fastener-driven region e is obtained. Therefore, even if the fastener-driven position varies within the range of the fastener-driven region e, each fastener is appropriately driven into two or more fastener-driven ribs and engaged with the two or more fastener-driven ribs. In addition, it is possible to easily set the height H, the inclination angle $\theta$ and the interval P of the fastener-driven ribs based on the needle length of each fastener and the fastener-driven region e.

According to the seventh aspect of the invention describes the case where the end portion of the upholstery stuck to the surface front side of the resin interior base material is folded toward the back side at the outer peripheral end portion of the resin interior base material and is fastened to the back side thereof with the fasteners. The fastener-driven ribs are formed so as to be parallel to the outer peripheral end portion of the resin interior base material, that is, so as to approach the outer peripheral end portion-side as the fastener-driven ribs protrude from the back side. Therefore, the end portion is appropriately fastened to the resin interior base material with the fasteners. That is, when the force is applied such that the end portion of the upholstery is peeled from the back side of the resin interior base material, the pullout force acts on the fasteners in the direction inclined toward the outer peripheral end portion of the resin interior base material. Therefore, the inclined posture of the fastener-driven ribs is maintained. In addition, a high pullout strength is appropriately obtained owing to twisting, or the like, due to deformation of the fastener-driven ribs.

BRIEF DESCRIPTION OF DRAWINGS

The features, advantages, and technical and industrial significance of this invention will be described below with reference to the accompanying drawings, in which like numerals denote like elements, and wherein:

FIG. 1A and FIG. 1B are views that show an example of a vehicle interior component to which the invention is applied and are sectional views that show portions near an outer peripheral end portion of the vehicle interior component, wherein FIG. 1A shows a state where an upholstery is fastened to a resin interior base material and FIG. 1B shows a state of the resin interior base material alone before the upholstery is fastened to the resin interior base material;

FIG. 5A and FIG. 5B are views that show cases where a thick-walled portion into which the fastener is driven is reduced in size in the vehicle interior component shown in FIG. 4, wherein FIG. 5A shows a case where the end portion is appropriately fastened to the resin interior base material with the fastener and FIG. 5B shows a case where a fastener-driven position deviates from an appropriate position.

DETAILED DESCRIPTION OF EMBODIMENT

Figure 1A:
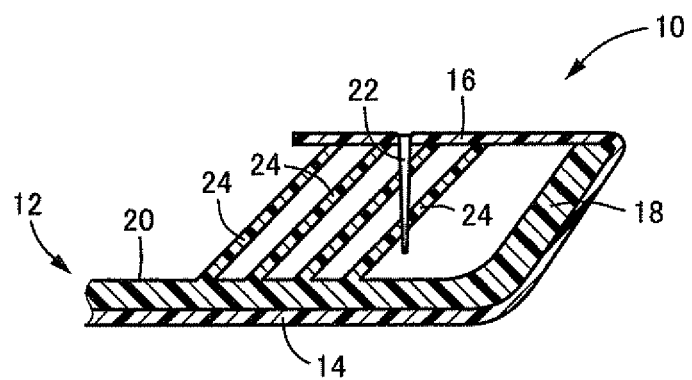

A vehicle interior component according to the invention is a door trim, an instrument panel, a luggage side trim, a pillar garnish, a seat back board, or the like. The vehicle interior component is applied to a case where a back-fastened member, for example, an upholstery, a noise insulator or a cushion is fastened to a back side of a resin interior base material with fasteners. Generally used various materials may be used as the resin interior base material, the upholstery, the noise insulator, the cushion, or the like. For example, the resin interior base material is formed of various general-purpose synthetic resin materials such as polypropylene, polyethylene, ABS and PVC. The back-fastened member, for example, the upholstery, the noise insulator or the cushion, may be made of a synthetic resin material or may be made of a material, for example, felt, which is other than a synthetic resin material.

The fastener is used to fasten the back-fastened member to a rib of the resin interior base material, into which the fastener is driven (hereinafter, referred to as "fastener-driven rib" where appropriate). The fastener is driven into the fastener-driven rib by a fastening device, and is also called, for example, a staple. A bar-like fastener, a rounded U-shaped fastener and a square U-shaped fastener are widely used. When one fastener is driven into a plurality of fastener-driven ribs, the fastener need not pass through all of these fastener-driven ribs as long as the fastener passes through at least one fastener-driven rib. That the fastener is in such a posture that the fastener intersects with the fastener-driven rib means that the fastener is not parallel to the fastener-driven rib. In this case, the fastener may be perpendicular to the plate-like fastener-driven rib or may be inclined with respect to the plate-like fastener-driven rib. When the first invention is implemented, at least one fastener-driven rib may be formed, and the fastener may be driven into the one fastener-driven rib so as to pass through the fastener-driven rib, whereby the fastener is engaged with the fastener-driven rib.

Preferably, the fastener-driven direction is, for example, the direction perpendicular to the back side of the resin interior base material in terms of workability. However, the fastener may be driven into the fastener-driven rib in a posture in which the fastener is inclined with respect to the back side, on condition that the fastener intersects with the fastener-driven rib. The fastener-driven direction is preferably set such that the fastener-driven direction does not coincide with the direction of a pullout force, which acts on the fastener when a force that peels the back-fastened member from the back side is applied. The fastener-driven direction is set in this way in order to obtain, for example, a predetermined pullout strength.

Each plate-like fastener-driven rib is formed in, for example, a flat plate-like shape. However, the fastener-driven rib may be bent in a dogleg shape in the direction in which the fastener-driven rib protrudes from the back side of the resin interior base material (hereinafter, referred to as "protruding direction" where appropriate), or may be curved in an arc shape in the protruding direction or in the widthwise direction that is perpendicular to the protruding direction. In addition, each fastener-driven rib need not have a constant thickness. For example, each fastener-driven rib may be formed such that the thickness becomes smaller toward its end. When multiple fastener-driven ribs are formed, the fastener-driven ribs are inclined in the same direction in the third invention, and the fastener-driven ribs are formed so as to be parallel to each other at a uniform height H, at a uniform inclination angle θ and at a uniform interval P in the sixth invention. When the first to third inventions are implemented, the inclination angles θ, the heights H, the intervals P, the shapes, or the like, of the plurality of fastener-driven ribs may be different from each other. In the first and second inventions, the fastener-driven ribs may protrude from the back side of the resin interior base material in different directions.

In the fourth and fifth inventions, in order to ensure an overlap region E or a fastener-driven region e each having a predetermined range, at least three fastener-driven ribs are formed. However, preferably, four or more fastener-driven ribs are formed. When the needle length of the fastener is greater than the height H of the fastener-driven rib and therefore the needle tip of the fastener reaches the back side of the resin interior base material if the fastener is driven into the resin interior base material in the direction perpendicular to the back side, the fastener-driven region e in the fifth invention coincides with the overlap region E in the fourth invention. How to set the height H of the fastener-driven rib depends on the thickness of the resin interior base material. However, it is preferable to set the height H of the fastener-driven rib to a value greater than the needle length of the fastener in order to reliably prevent the needle tip of the fastener from protruding from the outer surface. In this case, the fastener-driven region e is narrower than the overlap region E.

In the seventh invention in which the upholstery is folded toward the back side, the fastener-driven rib is formed so as to extend parallel to the outer peripheral end portion of the resin interior base material, that is, so as to approach the outer peripheral end portion-side as the fastener-driven rib protrudes from the back side. However, when the other inventions are implemented, for example, the direction in which the fastener-driven rib protrudes from the back side is appropriately set so as to inhibit the fastener from being disengaged from the fastener-driven rib when a force is applied such that the back-fastened member is peeled from the resin interior base material. Also in the vehicle interior component in which the upholstery is folded toward the back side of the resin interior base material and fastened to the back side with fasteners, when the inventions other than the seventh invention are implemented, the direction in which the fastener-driven rib protrudes from the back side may be appropriately set to a selected direction different from the direction in which the fastener-driven rib approaches toward the outer peripheral end portion-side as the fastener-driven rib protrudes from the back side. In this case as well, by appropriately setting the fastener-driven direction with respect to the direction in which the fastener-driven rib protrudes from the back side, it is possible to ensure a predetermined pullout strength.

Figure 1B:
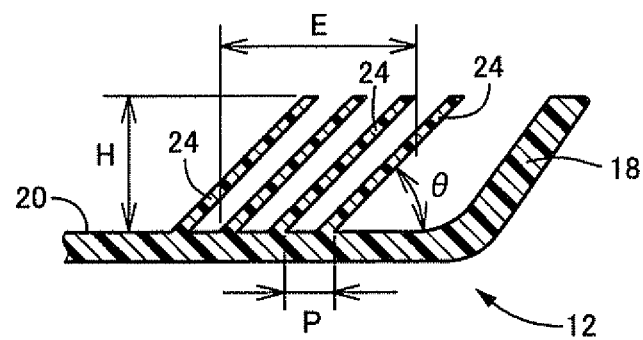

Hereafter, an embodiment of the invention will be described in detail with reference to the accompanying drawings. FIG. 1A and FIG. 1B are sectional views that show portions near an outer peripheral end portion of a vehicle interior component 10, for example, a door trim. FIG. 1A shows a state where an upholstery 14 is fastened to a resin interior base material 12. FIG. 1B shows a state of the resin interior base material 12 alone before the upholstery 14 is fastened to the resin interior base material 12. The vehicle interior component 10 is formed by sticking the upholstery 14 integrally to a front side of the resin interior base material 12 made of a synthetic resin material, for example, polypropylene, with an adhesive agent, or the like. An end portion 16 of the upholstery 14 is folded toward a back side 20 of the resin interior base material 12 at an outer peripheral end portion 18 of the resin interior base material 12, and is fastened integrally to the resin interior base material 12 with a plurality of fasteners 22 along the outer peripheral end portion 18.

Multiple (four in this embodiment) fastener-driven ribs 24 are formed on the back side 20 of the resin interior base material 12, at positions on the inner side of the outer peripheral end portion 18. The fastener-driven ribs 24 are formed so as to be parallel to the outer peripheral end portion 18, that is, so as to approach the outer peripheral end portion 18-side as the fastener-driven ribs 24 protrude from the back side 20. Each of these fastener-driven ribs 24 has a plate-like shape, is relatively thin, and has plasticity. The thickness of each of these fastener-driven ribs 24 is slightly reduced toward its end. These fastener-driven ribs 24 are integrally formed with the resin interior base material 12 through injection molding, or the like. In addition, these fastener-driven ribs 24 are formed so as to extend parallel to each other at a uniform height H, at a uniform inclination angle θ and at a uniform interval P in its inclination direction, that is, the lateral direction in FIG. 1A and FIG. 1B. Further, the height H, the inclination angle θ and the interval P of the fastener-driven ribs 24 are set such that, when viewed in the direction perpendicular to the back side 20 of the resin interior base material 12, that is, when viewed from the upper side in FIG. 1A and FIG. 1B, the overlap region E in which two or more fastener-driven ribs 24 overlap each other is continuously present over a predetermined range that spans the four fastener-driven ribs 24. Each of the fastener-driven ribs 24 is, for example, formed annularly along the entire circumference of the resin interior base material 12 so as to be substantially parallel to the outer peripheral end portion 18 of the resin interior base material 12.

Meanwhile, the end portion 16 of the upholstery 14 is overlapped with the plurality of ribs 24 so as to be in contact with the ends of these fastener-driven ribs 24. In this state, each of the fasteners 22 is driven into the end portion 16 of the upholstery 14 and the fastener-driven ribs 24 so as to pass through the end portion 16 and the fastener-driven ribs 24, in such a posture that the fastener 24 intersects with the fastener-driven ribs 24. Thus, the fastener 24 is engaged with the fastener-driven ribs 24, and presses the end portion 16 against the ends of the fastener-driven ribs 24 so that the end portion 16 is fastened as shown in FIG. 1A. In this case, the fastener-driven ribs 24 are inclined at the predetermined inclination angle θ and have plasticity, while the fasteners 22 are driven into the fastener-driven ribs 24 so as to pass through the fastener-driven ribs 24 in such a posture that the fasteners 22 intersect with the fastener-driven ribs 24. Therefore, when force is applied to the fasteners 22 in such a direction that the fasteners 22 are pulled out of the fastener-driven ribs 24, twisting, or the like, due to deformation of the fastener-driven ribs 24 prevents the fasteners 22 from being pulled out of the fastener-driven ribs 24. Therefore, it is possible to obtain a pullout strength sufficient to fasten the end portion 16 appropriately. Preferably, the inclination angle θ is within a range from approximately 20° to approximately 70° in order to obtain a predetermined pullout strength. Further preferably, the inclination angle θ is within a range from approximately 30° to approximately 60°.

Figure 2A:
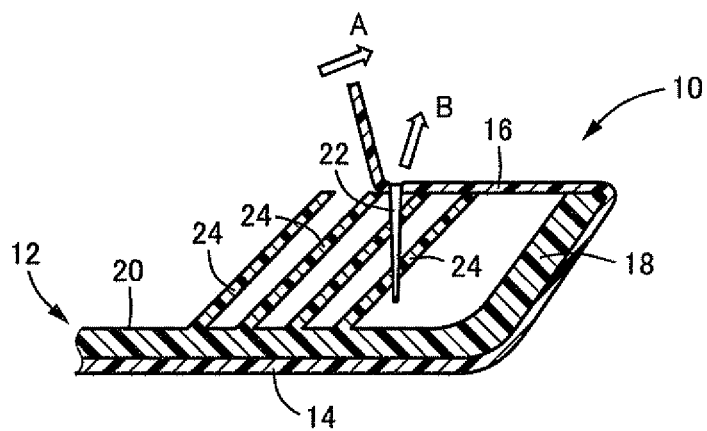
FIG. 2A and FIG. 2B are views that illustrate a comparison of a pullout strength of a fastener when a peeling force A acts on an end portion of the upholstery, between two cases that differ in direction in which the fastener is driven into the resin interior base material (hereinafter, referred to as "fastener-driven direction" where appropriate) in the vehicle interior component shown in FIG. 1A and FIG. 1B.
Figure 2B:
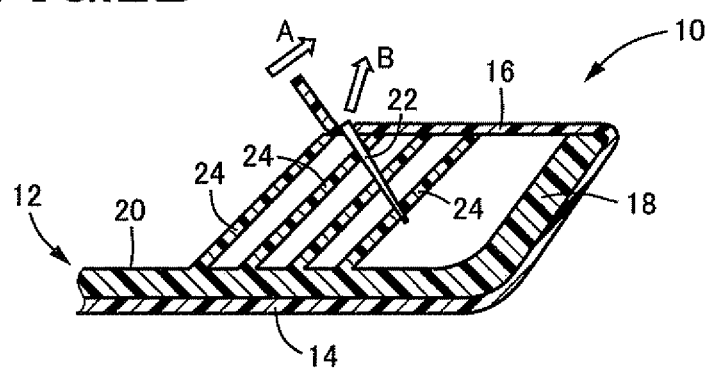

Preferably, the fastener-driven direction is, for example, the direction perpendicular to the back side 20 of the resin interior base material 12 in terms of workability. However, the fasteners 22 may be driven into the fastener-driven ribs 24 in such a posture that the fasteners 22 are inclined with respect to the back side 20 on condition that the fasteners 22 intersect with the fastener-driven ribs 24. In order to obtain a predetermined pullout strength, the fastener-driven direction is preferably set so as not to coincide with the direction of a pullout force B that acts on the fasteners 22 when a peeling force A that peels the end portion 16 from the resin interior base material 12 is applied, for example, as shown in FIG. 2A and FIG. 2B considering the direction of the pullout force B. FIG. 2A shows a case where the fastener 22 is driven into the fastener-driven ribs 24 in the direction perpendicular to the back side 20. FIG. 2B shows a case where the fastener 22 is driven into the fastener-driven ribs 24 in such a posture that the fastener 22 is inclined in the direction opposite to the direction in which the fastener-driven ribs 24 protrude from the back side 20. In the case of FIG. 2B, the fastener-driven direction intersects at a relatively large angle with the direction of the pullout force B. Therefore, the fastener 22 is less prone to be disengaged from the fastener-driven ribs 24 than in the case shown in FIG. 2A. Accordingly, a pullout strength larger than that in FIG. 2A is obtained.

In addition, in the overlap region E, there are two or more overlapped fastener-driven ribs 24 when viewed in the direction perpendicular to the back side 20 of the resin interior base material 12. Therefore, when the fastener 22 is driven into the fastener-driven ribs 24 in the direction substantially perpendicular to the back side 20 as shown in FIG. 2A, one fastener 22 can be driven into two or more fastener-driven ribs 24. Therefore, when the pullout force B acts on the fastener 22, each of the plurality of fastener-driven ribs 24 individually deforms, and a higher pullout strength is obtained owing to twisting, or the like, due to a difference in deformation among the fastener-driven ribs 24. This further effectively prevents the fastener 22 from being disengaged from the fastener-driven ribs 24 or the end portion 16 from peeling from the resin interior base material 12. Even when the fastener 22 is driven into the fastener-driven ribs 24 in such a posture that the fastener 22 is inclined with respect to the direction perpendicular to the back side 20 as shown in FIG. 2B, one fastener 22 can driven into the plurality of fastener-driven ribs 24. Therefore, advantageous effects similar to those described above are obtained.

Figure 3:
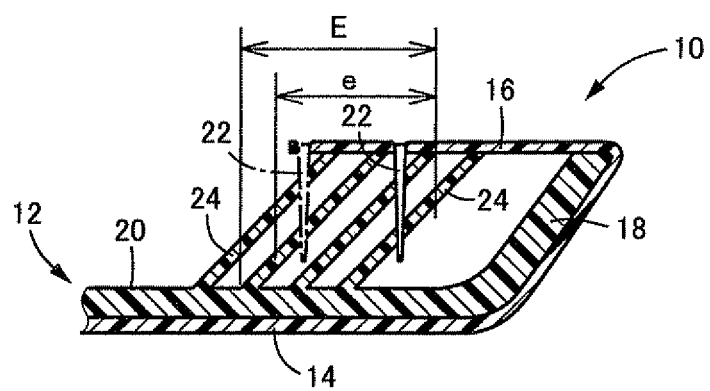
FIG. 3 is a sectional view that illustrates a region e in which the end portion of the upholstery can be fastened to the resin interior base material with the fastener (hereinafter, referred to as "fastener-driven region" where appropriate) in the vehicle interior component shown in FIG. 1A and FIG. 1B.

When the needle length of each fastener 22 is greater than the sum of the thickness of the end portion 16 and the height H, even if the fastener-driven position varies, one fastener 22 is driven into two or more fastener-driven ribs 24 and engaged with these fastener-driven ribs 24 as long as the fastener-driven position falls within the overlap region E. In the present embodiment, because the needle length of each fastener 22 is less than the height H, not every fastener 22 is driven into two or more fastener-driven rib 24 within the entire range of the overlap region E. However, within the fastener-driven region e shown in FIG. 3, when the fastener 22 is driven into the fastener-driven ribs 24 in the direction perpendicular to the back side 20, every fastener 22 is driven into two or more fastener-driven ribs 24. In this way, as long as the fastener-driven position falls within the relatively wide and continuous fastener-driven region e, even if the fastener-driven position varies, the fastener 22 is driven into two or more fastener-driven ribs 24 as shown by the alternate long and short dash line. Therefore, work for driving the fasteners 22 into the fastener-driven ribs 24 is easily performed, and automation thereof becomes easy. In addition, a margin space remains between the fasteners 22 driven into the fastener-driven ribs 24 and the back side 20. This reliably prevents the fasteners 22 from protruding from the outer surface. The fastener-driven region e is set to cover a predetermined range within which the fastener-driven position may vary. The height H, the inclination angle θ and the interval P of the plurality of fastener-driven ribs 24 are set in consideration of the needle length of each fastener 22 so that the fastener-driven region e is obtained.

As described above, in the fastening structure according to the present embodiment, the plate-like fastener-driven ribs 24 having plasticity are integrally formed with the back side 20 of the resin interior base material 12 so as to protrude from the back side 20, in such a posture that the fastener-driven ribs 24 are inclined at the predetermined inclination angle θ. Then, the end portion 16 is overlapped with the fastener-driven ribs 24, and the fasteners 22 are driven into the end portion 16 and the fastener-driven ribs 24 so as to pass through the end portion 16 and the fastener-driven ribs 24. In this way, the fasteners 22 are engaged with the fastener-driven ribs 24. In this case, the fastener-driven ribs 24 are inclined at the predetermined inclination angle θ and have plasticity. Meanwhile, the fasteners 22 are driven into the fastener-driven ribs 24 so as to pass through the fastener-driven ribs 24 in such a posture that the fasteners 22 intersect with the fastener-driven ribs 24. Therefore, even if the pullout force B acts on the fasteners 22, twisting, or the like, due to deformation of the fastener-driven ribs 24 prevents the fasteners 22 from being pulled out. Therefore, a pullout strength sufficient to fasten the end portion 16 appropriately is obtained.

Figure 4:
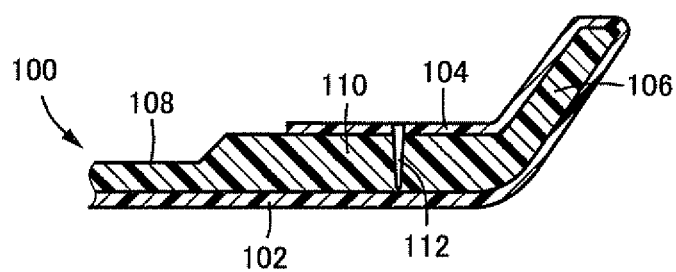
FIG. 4 is a sectional view that shows portions near an outer peripheral end portion of an existing vehicle interior component in which an end portion of an upholstery is fastened to a back side of a resin interior base material with a fastener.
Figure 5A:
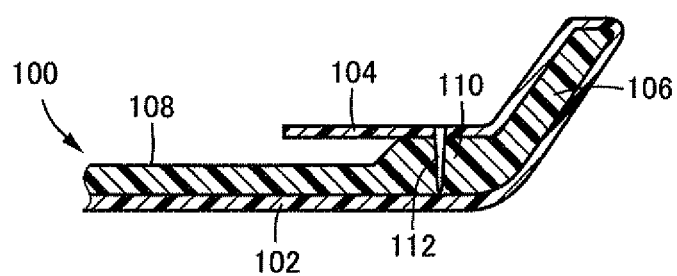
Figure 5B:
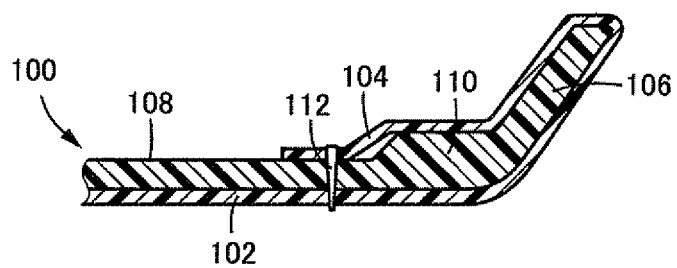

In addition, the plate-like fastener-driven ribs 24 are formed in a relatively thin shape. Therefore, poor appearance such as deformation and shrinkage is less prone to occur, a forming cycle is reduced, and it is possible to more reliably prevent the needle tip of each fastener 22 from protruding from the outer surface by appropriately setting the height H of the fastener-driven ribs 24, than in the case of the existing structure shown in FIG. 4 and FIG. 5 where the thick-walled portion 110 is formed. In the present embodiment, the height H of the fastener-driven rib 24 is greater than the needle length of each fastener 22, and therefore a margin space remains between each fastener 22 and the back side 20. This appropriately prevents each fastener 22 from protruding from the outer surface.

In addition, in the present embodiment, the fastener-driven region e, in which each fastener 22 is driven into two or more fastener-driven ribs 24 when the fastener 22 is driven into the fastener-driven ribs 24 in the direction perpendicular to the back side 20 of the resin interior base material 12, is present continuously over a predetermined range in the inclination direction of the fastener-driven ribs 24. Therefore, even if the fastener-driven position varies within the range of the fastener-driven region e, each fastener 22 is driven into two or more fastener-driven ribs 24 and engaged with the two or more fastener-driven ribs 24. Thus, a higher pullout strength is obtained owing to twisting, or the like, due to individual deformation of the plurality of fastener-driven ribs 24. This further effectively prevents the fasteners 22 from being disengaged from the fastener-driven ribs 24 and, in addition, the end portion 16 from peeling from the resin interior material 12. Meanwhile, the fastener-driven region e is set so as to cover the predetermined range within which the fastener-driven position may vary. Therefore, the work for driving the fasteners 22 into the fastener-driven ribs 24 is easily performed or automation thereof becomes easy.

In addition, in the present embodiment, each of the plurality of fastener-driven ribs 24 has a plate-like shape, the height H, the inclination angle θ and the interval P of the plurality of fastener-driven ribs 24 are uniform and are set in consideration of the needle length of each fastener 22 so that the fastener-driven region e is obtained. Therefore, even if the fastener-driven position varies within the range of the fastener-driven region e, each fastener 22 is appropriately driven into two or more fastener-driven ribs 24 and engaged with the two or more fastener-driven ribs 24. Therefore, it is possible to reliably obtain a high pullout strength. In addition, it is possible to easily design the height H, the inclination angle θ and the interval P of the fastener-driven ribs 24 based on the needle length of each fastener 22 and the fastener-driven region e.

In addition, the present embodiment describes the case where the end portion 16 of the upholstery 14 stuck to the surface (front side) of the resin interior base material 12 is folded toward the back side 20 at the outer peripheral end portion 18 of the resin interior base material 12 and is fastened to the fastener-driven ribs 24 with the fasteners 22. The fastener-driven ribs 24 are formed so as to be parallel to the outer peripheral end portion 18 of the resin interior base material 12, that is, so as to approach the outer peripheral end portion 18-side as the fastener-driven ribs 24 protrude from the back side 20. Therefore, the end portion 16 is appropriately fastened to the resin interior base material 12 with the fasteners 22. That is, as shown in FIG. 2A and FIG. 2B, when the peeling force A is applied such that the end portion 16 of the upholstery 14 is peeled from the back side 20 of the resin interior base material 12, the pullout force B acts on the fasteners 22 in the direction inclined toward the outer peripheral end portion 18 of the resin interior base material 12. Therefore, the inclined posture of the fastener-driven ribs 24 that are inclined in the same direction as the direction of the pullout force B is maintained. In addition, a high pullout strength is appropriately obtained owing to twisting, or the like, due to deformation of the fastener-driven ribs 24.

The embodiment of the invention is described in detail above with reference to the accompanying drawings. However, the embodiment is just one example embodiment. The invention may be implemented in forms with various modifications or improvements on the basis of the knowledge of a person skilled in the art.

What is claimed is:

1. A vehicle interior component in which a back-fastened member is fastened to a back side of a resin interior base material with a fastener, comprising:
   a fastener-driven rib having plasticity and plate shape integrally formed on the back side of the resin interior base material so as to protrude from the back side in such a posture that the fastener-driven rib is inclined at a predetermined angle with respect to the back side; and
   the fastener driven into the fastener-driven rib so as to pass through the fastener-driven rib in such a posture that the fastener intersects with the fastener-driven rib, whereby the fastener is engaged with the fastener-driven rib.

2. The vehicle interior component according to claim 1, wherein a plurality of the fastener-driven ribs are formed, and the fastener is driven into at least two of the plurality of the fastener-driven ribs and engaged with the at least two of the plurality of the fastener-driven ribs.

3. The vehicle interior component according to claim 2, wherein:
   the back-fastened member is an upholstery that is stuck to a front side of the resin interior base material, an end portion of the upholstery is folded toward the back side at an outer peripheral end portion of the resin interior base material and is fastened to the fastener-driven rib with the fastener; and
   the fastener-driven rib is formed so as to be parallel to the outer peripheral end portion of the resin interior base material and so as to approach the outer peripheral end portion-side as the fastener-driven rib protrude from the back side.

4. The vehicle interior component according to claim 2, wherein the plurality of the fastener-driven ribs are inclined in a same inclination direction on the back side of the resin interior base material, and the plurality of the fastener-driven ribs are formed at a predetermined interval in the inclination direction such that the fastener-driven ribs overlap each other with at least part thereof in a direction perpendicular to the back side of the resin interior base material.

5. The vehicle interior component according to claim 4, wherein:
   the back-fastened member is an upholstery that is stuck to a front side of the resin interior base material, an end portion of the upholstery is folded toward the back side at an outer peripheral end portion of the resin interior base material and is fastened to the fastener-driven rib with the fastener; and
   the fastener-driven rib is formed so as to be parallel to the outer peripheral end portion of the resin interior base material and so as to approach the outer peripheral end portion-side as the fastener-driven rib protrude from the back side.

6. The vehicle interior component according to claim 4, wherein the plurality of the fastener-driven ribs are formed such that a fastener-driven region e, in which the fastener is driven into two or more of the fastener-driven ribs when the fastener is driven into the fastener-driven ribs in the direction perpendicular to the back side of the resin interior base material, is present continuously over a predetermined range that spans three or more of the fastener-driven ribs in the inclination direction.

7. The vehicle interior component according to claim 6, wherein:
   the plurality of the fastener-driven ribs each have a flat plate shape and are formed so as to be parallel to each other at a uniform height H, at a uniform inclination angle θ and at a uniform interval P; and
   the height H, the inclination angle θ and the interval P of the fastener-driven ribs are set in consideration of a needle length of the fastener such that the fastener-driven region e is obtained.

8. The vehicle interior component according to claim 4, wherein the plurality of the fastener-driven ribs are formed such that an overlap region E in which two or more of the fastener-driven ribs overlap each other in the direction perpendicular to the back side of the resin interior base material is present continuously over a predetermined range that spans three or more of the fastener-driven ribs in the inclination direction.

9. The vehicle interior component according to claim 8, wherein:
   the back-fastened member is an upholstery that is stuck to a front side of the resin interior base material, an end portion of the upholstery is folded toward the back side at an outer peripheral end portion of the resin interior base material and is fastened to the fastener-driven rib with the fastener; and
   the fastener-driven rib is formed so as to be parallel to the outer peripheral end portion of the resin interior base material and so as to approach the outer peripheral end portion-side as the fastener-driven rib protrude from the back side.

10. The vehicle interior component according to claim 8, wherein the plurality of the fastener-driven ribs are formed such that a fastener-driven region e, in which the fastener is driven into two or more of the fastener-driven ribs when the fastener is driven into the fastener-driven ribs in the direction perpendicular to the back side of the resin interior base material, is present continuously over a predetermined range that spans three or more of the fastener-driven ribs in the inclination direction.

11. The vehicle interior component according to claim 10, wherein:
   the plurality of the fastener-driven ribs each have a flat plate shape and are formed so as to be parallel to each other at a uniform height H, at a uniform inclination angle θ and at a uniform interval P; and
   the height H, the inclination angle θ and the interval P of the fastener-driven ribs are set in consideration of a needle length of the fastener such that the fastener-driven region e is obtained.

12. The vehicle interior component according to claim 1, wherein a plurality of the fastener-driven ribs are inclined in a same inclination direction on the back side of the resin interior base material, and the plurality of the fastener-driven ribs are formed at a predetermined interval in the inclination direction such that the fastener-driven ribs overlap each other with at least part thereof in a direction perpendicular to the back side of the resin interior base material.

13. The vehicle interior component according to claim 12, wherein:
   the back-fastened member is an upholstery that is stuck to a front side of the resin interior base material, an end portion of the upholstery is folded toward the back side at an outer peripheral end portion of the resin interior base material and is fastened to the fastener-driven rib with the fastener; and the fastener-driven rib is formed so as to be parallel to the outer peripheral end portion of the resin interior base material and so as to approach the outer peripheral end portion-side as the fastener-driven rib protrude from the back side.

14. The vehicle interior component according to claim 12, wherein the plurality of the fastener-driven ribs are formed such that a fastener-driven region e, in which the fastener is driven into two or more of the fastener-driven ribs when the fastener is driven into the fastener-driven ribs in the direction perpendicular to the back side of the resin interior base material, is present continuously over a predetermined range that spans three or more of the fastener-driven ribs in the inclination direction.

15. The vehicle interior component according to claim 14, wherein:
   the plurality of the fastener-driven ribs each have a flat plate shape and are formed so as to be parallel to each other at a uniform height H, at a uniform inclination angle $\theta$ and at a uniform interval P; and
   the height H, the inclination angle $\theta$ and the interval P of the fastener-driven ribs are set in consideration of a needle length of the fastener such that the fastener-driven region e is obtained.

16. The vehicle interior component according to claim 12, wherein the plurality of the fastener-driven ribs are formed such that an overlap region E in which two or more of the fastener-driven ribs overlap each other in the direction perpendicular to the back side of the resin interior base material is present continuously over a predetermined range that spans three or more of the fastener-driven ribs in the inclination direction.

17. The vehicle interior component according to claim 16, wherein:
   the back-fastened member is an upholstery that is stuck to a front side of the resin interior base material, an end portion of the upholstery is folded toward the back side at an outer peripheral end portion of the resin interior base material and is fastened to the fastener-driven rib with the fastener; and
   the fastener-driven rib is formed so as to be parallel to the outer peripheral end portion of the resin interior base material and so as to approach the outer peripheral end portion-side as the fastener-driven rib protrude from the back side.

18. The vehicle interior component according to claim 16, wherein the plurality of the fastener-driven ribs are formed such that a fastener-driven region e, in which the fastener is driven into two or more of the fastener-driven ribs when the fastener is driven into the fastener-driven ribs in the direction perpendicular to the back side of the resin interior base material, is present continuously over a predetermined range that spans three or more of the fastener-driven ribs in the inclination direction.

19. The vehicle interior component according to claim 18, wherein:
   the plurality of the fastener-driven ribs each have a flat plate shape and are formed so as to be parallel to each other at a uniform height H, at a uniform inclination angle $\theta$ and at a uniform interval P; and
   the height H, the inclination angle $\theta$ and the interval P of the fastener-driven ribs are set in consideration of a needle length of the fastener such that the fastener-driven region e is obtained.

20. The vehicle interior component according to claim 1, wherein:
   the back-fastened member is an upholstery that is stuck to a front side of the resin interior base material, an end portion of the upholstery is folded toward the back side at an outer peripheral end portion of the resin interior base material and is fastened to the fastener-driven rib with the fastener; and
   the fastener-driven rib is formed so as to be parallel to the outer peripheral end portion of the resin interior base material and so as to approach the outer peripheral end portion-side as the fastener-driven rib protrude from the back side.

* * * * *